United States Patent [19]

Kohyama et al.

[11] Patent Number: 4,733,639
[45] Date of Patent: Mar. 29, 1988

[54] AIR INTAKE SYSTEM

[75] Inventors: Mikihiro Kohyama; Goroei Wakatsuki, both of Saitama, Japan

[73] Assignee: Honda Giken Kogyo Kabushiki Kaisha, Tokyo, Japan

[21] Appl. No.: 824,001

[22] Filed: Jan. 29, 1986

[30] Foreign Application Priority Data

Jan. 29, 1985 [JP] Japan .................................. 60-15070

[51] Int. Cl.⁴ .............................................. F02F 1/34
[52] U.S. Cl. ................................ 123/198 E; 123/41.7; 180/229
[58] Field of Search ............... 123/41.31, 41.7, 195 C, 123/198 E, 2; 74/606 R, 606 A; 180/219, 227, 229, 230

[56] References Cited

U.S. PATENT DOCUMENTS

| | | | |
|---|---|---|---|
| 2,815,742 | 12/1957 | Kiekhaefer | 123/198 E |
| 3,949,726 | 4/1976 | List | 123/198 E |
| 4,126,115 | 11/1978 | List et al. | 123/198 E |
| 4,141,334 | 2/1979 | Hatz et al. | 123/198 E |
| 4,324,208 | 4/1982 | Danckert et al. | 123/198 E X |
| 4,608,946 | 9/1986 | Tanaka et al. | 123/2 |

Primary Examiner—Tony M. Argenbright
Attorney, Agent, or Firm—Lyon & Lyon

[57] ABSTRACT

An air intake system is combined with a power unit cooling system in a motor scooter. An air cleaner is disposed within the power unit casing and an outlet from the power unit is connected directly to the engine.

7 Claims, 5 Drawing Figures

AIR INTAKE SYSTEM

BACKGROUND OF THE INVENTION

The field of the present invention is air intake systems for motor vehicles.

Enclosed belt drive transmissions preferably include some cooling means to insure proper dissipation of heat generated therein. To accomplish this additional components and/or additional complication to other components are generally required. For example, in motorcycles and similar vehicles, a cooling fan may be required in the vehicle's transmission or belt drive chamber. Such cooling systems are generally independent of the air intake system for the vehicle thus resulting in increased weight and higher material, manufacturing and maintenance costs.

SUMMARY OF THE INVENTION

The present invention combines an air intake system for the power unit with a cooling system for the transmission of a vehicle. To this end, the intake air of the vehicle is directed through the transmission of the vehicle before it reaches the engine. The invention thus provides a vehicle of lower weight, reduced material and manufacturing costs and easier and less costly maintenance.

Accordingly, it is an object of the present invention to provide a combined air intake and transmission cooling system. Other and further objects and advantages will appear hereinafter.

DETAILED DESCRIPTION OF THE PREFERRED EMBODIMENTS

Figure 1:
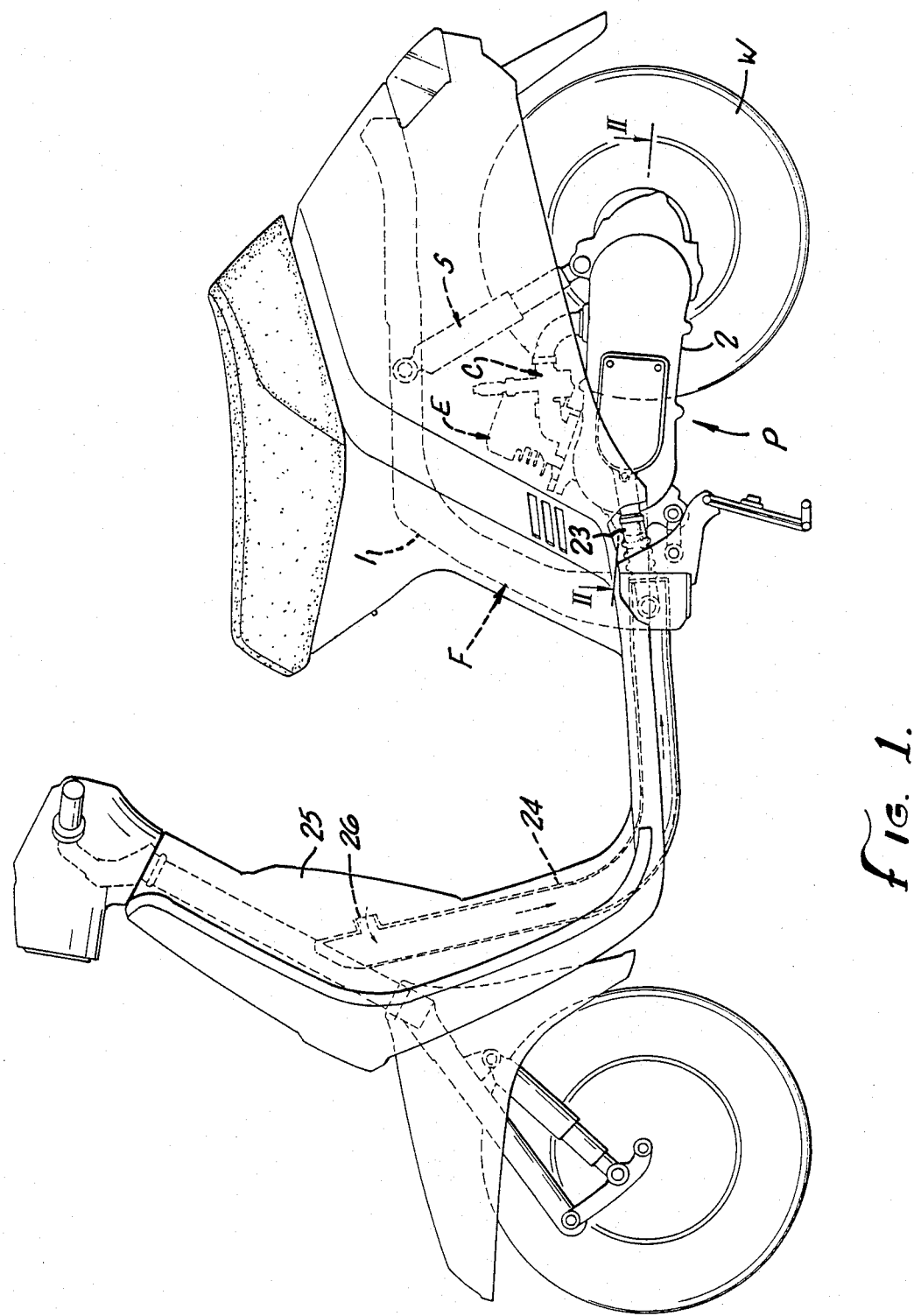
FIG. 1 is a side view of a motor scooter employing the present invention.

Turning in detail to the drawings, FIG. 1 illustrates a motorcycle of the scooter type employing an embodiment of the present invention. The scooter includes a body frame F to which is pivotally mounted a power unit P including an engine E having a carburetor C. The power unit P extends to a wheel W. A cushion member S resists upward pivotal movement of the power unit P, thereby forming a suspension system for the rear wheel W.

The power unit P is specifically situated beneath a rear frame 1 and is principally contained within a power unit casing 2 including a case body 3 and a side case 4. A seal 5 closes the case body 3 with the side case 4. Included with the case body 3 is a crankcase 6 within which is mounted a crankshaft 7. Defined within the power unit casing is a transmission chamber 8.

Power is directed from the crankshaft 7 to the rear wheel W through a transmission device T. A variable pulley 9 driven by the crankshaft 7 drives an output pulley 10 and in turn a transmission shaft 11 by means of a V-belt 12. Engagement of the engine E with the rear wheel W is controlled by means of a clutch 13. The transmission shaft 11 drives a wheel shaft 14 through a gear 15.

Figure 2:
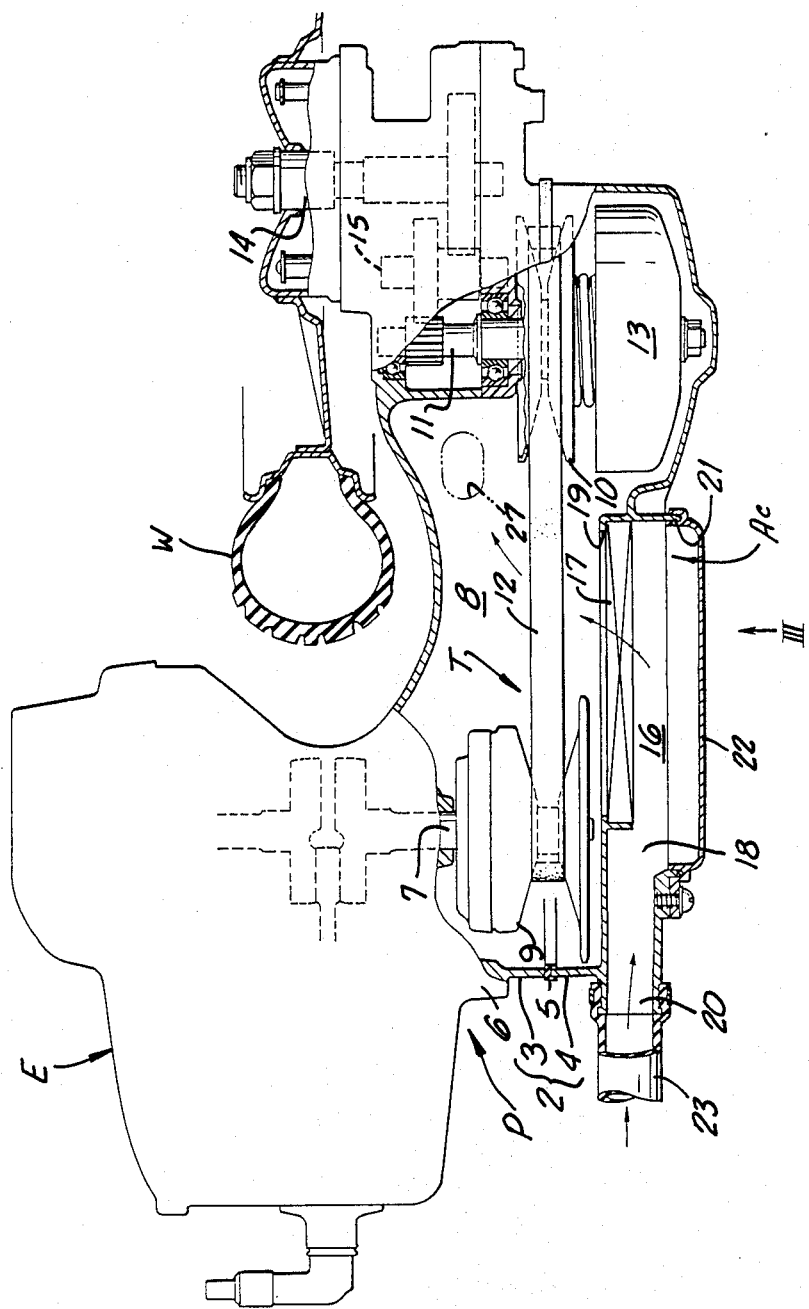
FIG. 2 is a sectional top view of a power unit embodying the present invention taken along line II—II of FIG. 1.
Figure 3:
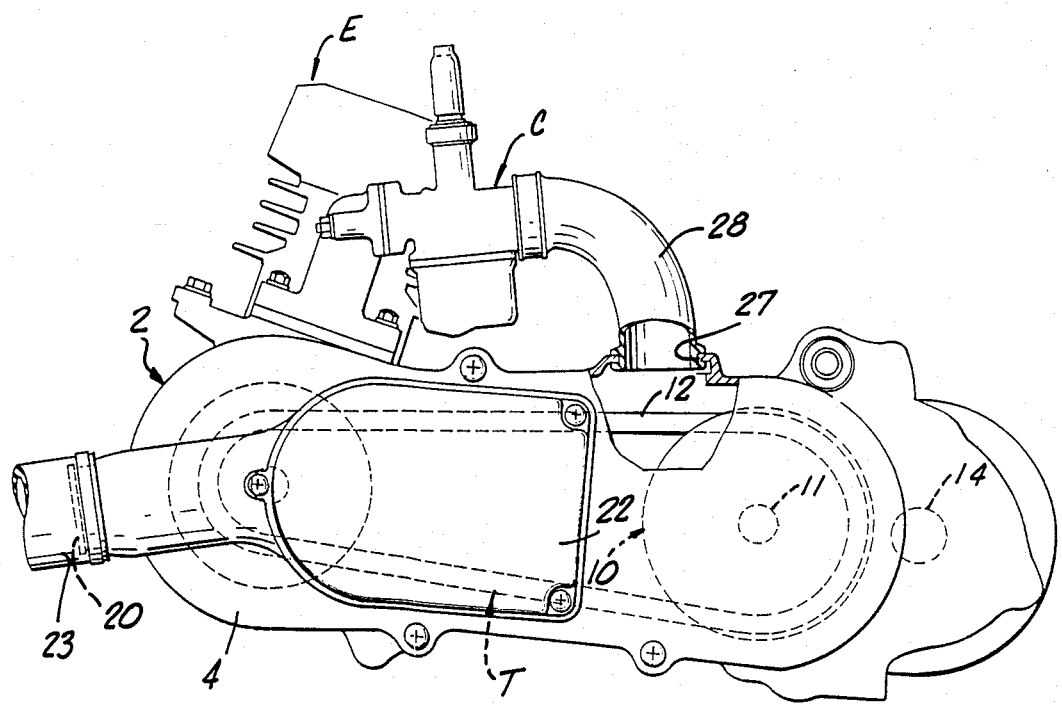
FIG. 3 is a side view of the embodiment of FIG. 2.

The transmission T and associated components of the power unit P tend to build up heat during operation. Consequently, it is advantageous to provide cooling air flow for the transmission mechanism. With such air flow, heat does not build up within the power unit. In the embodiment of FIGS. 2 and 3, air is provided through an air cleaner assembly Ac. An air collection chamber 16 is defined within the side case 4 of the power unit P. An air cleaner element 17 sits within the air collection chamber 16 to receive incoming air from an entrance 18. The cleaner element 17 sits adjacent an outlet 19 such that air coming through the inlet 18 into the chamber 16 must pass through the element 17 and then through the outlet 19 into the transmission chamber 8. This flow is indicated by arrows. Air to the inlet 18 is provided through a port 20 through the side case 4. An access port 21 covered by a cover plate 22 provides access to the air cleaner system Ac for replacement of the cleaner element 17.

Coupled with the port 20 in the side case 4 is an intake passage including a flexible connecting pipe 23 and an air intake pipe 24. The air intake pipe 24 extends up to a position behind the front cover 25 of the vehicle to an air intake opening 26. This arrangement is illustrated in FIG. 1. The coupling pipe 23 is flexible to accommodate the swinging motion of the power unit P as it acts as a suspension system for the rear wheel W. The location of the opening 26 provides minimum exposure to the elements such that rain, mud and the like will not be easily drawn into the inlet.

To draw the air flow through the power unit casing 2, the carburetor C to the engine E is coupled to a port 27 by means of a flexible pipe 28. The port 27 opens into the transmission chamber 8 to necessarily draw air through the cleaner element 17 and through the transmission chamber 8. In this way, means for directing air through the transmission chamber 8 separate and apart from the air intake system can be eliminated.

Figure 4:
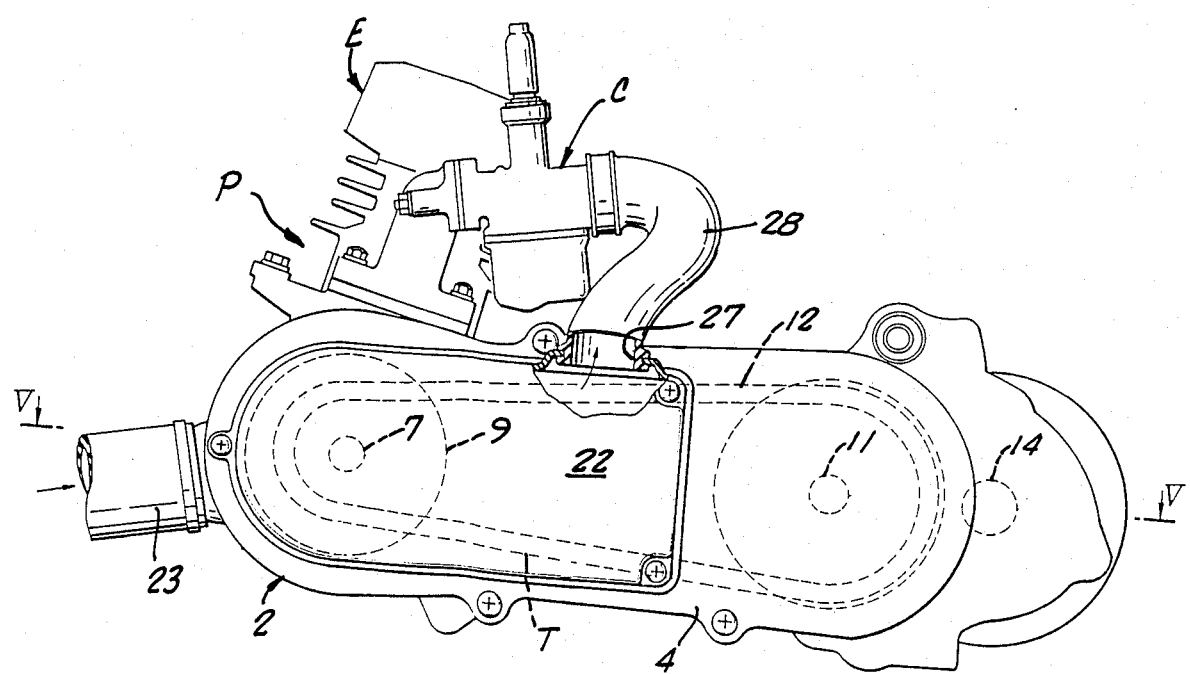
FIG. 4 is a side view of another embodiment of the present invention.
Figure 5:
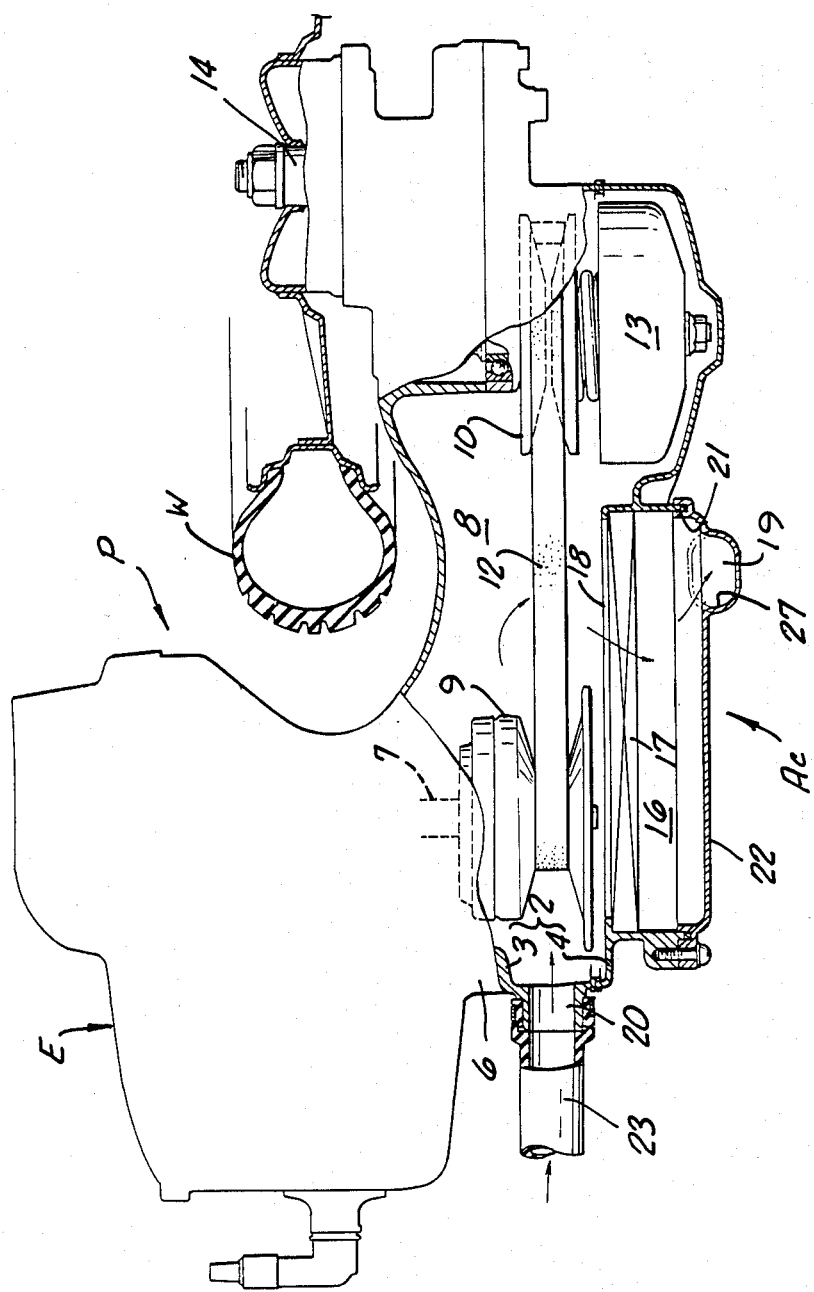
FIG. 5 is a sectional top view of the embodiment of FIG. 4.

A second embodiment is illustrated in FIGS. 4 and 5. The same reference numerals as employed with the first embodiment are employed here for identical and equivalent elements. The second embodiment differs from that of FIGS. 2 and 3 in the routing of air through the transmission chamber 8. The inlet 20 directs air first into the transmission chamber 8 and then the air passes through the filter 17 and into the port 27 to the carburetor C. In this way, the air to the carburetor cannot be contaminated by debris located in the transmission chamber 8.

Thus an air intake system is disclosed which combines the air intake and air cleaning functions with the power unit cooling function. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A power unit having an engine with an air intake and a transmission, comprising:
    a power unit case enclosing the transmission and including an air collection chamber and a transmission chamber;

a cleaner element in said power unit case between said air collection chamber and said transmission chamber;

an air inlet to said power unit case; and an air outlet from said power unit case connected to the air intake of the engine, one of said air inlet and said air outlet being on one side of said cleaner element and the other of said air inlet and said air outlet being on the other side of said cleaner element.

2. The power unit of claim 1 wherein said air inlet is on said air collection chamber side of said cleaner element.

3. The power unit of claim 1 wherein said air outlet is on said air collection chamber side of said cleaner element.

4. A power unit comprising:

a casing;

means dividing said casing into a transmission chamber and an air collection chamber;

means forming an opening to connect said chambers in fluid communication;

an air inlet communicating with one of said chambers;

an air outlet communicating with the other of said chambers;

a transmission in said transmission chamber;

an engine having an air intake connected to said air outlet; and means for conducting air supplied to said air inlet between said chambers and in heat transfer relation with said transmission prior to discharge from said air outlet into said engine air intake.

5. The power unit as recited in claim 4 including an air cleaner in the opening between said chambers.

6. The power unit as recited in claim 5 in which said air inlet communicates with said air collection chamber and said air outlet communicates with said transmission chamber.

7. The power unit as recited in claim 5 in which said air inlet communicates with said transmission chamber and said air outlet communicates with said air collection chamber.

* * * * *